United States Patent
Shentu

(10) Patent No.: US 11,594,867 B2
(45) Date of Patent: Feb. 28, 2023

(54) SAFETY DOME COVER LOCK ASSEMBLY

(71) Applicant: Yuanli Shentu, Oxford, CT (US)

(72) Inventor: Yuanli Shentu, Oxford, CT (US)

( * ) Notice: Subject to any disclaimer, the term of this patent is extended or adjusted under 35 U.S.C. 154(b) by 105 days.

(21) Appl. No.: 17/144,042

(22) Filed: Jan. 7, 2021

(65) Prior Publication Data

US 2021/0210940 A1  Jul. 8, 2021

Related U.S. Application Data

(60) Provisional application No. 62/957,921, filed on Jan. 7, 2020.

(51) Int. Cl.

| | |
|---|---|
| *H02G 3/14* | (2006.01) |
| *H02G 3/08* | (2006.01) |
| *H01H 9/22* | (2006.01) |
| *H01R 13/447* | (2006.01) |
| *H01H 9/02* | (2006.01) |
| *H01R 13/639* | (2006.01) |
| *H01R 25/00* | (2006.01) |

(52) U.S. Cl.
CPC ............... *H02G 3/14* (2013.01); *H01H 9/02* (2013.01); *H01H 9/22* (2013.01); *H01R 13/447* (2013.01); *H01R 13/6395* (2013.01); *H02G 3/081* (2013.01); *H01H 2009/0292* (2013.01); *H01R 25/003* (2013.01); *H01R 25/006* (2013.01)

(58) Field of Classification Search
CPC ............ H02G 3/14; H02G 3/08; H02G 3/081; H01H 9/02; H01H 9/22; H01H 2009/0292; H01H 13/04; H01R 13/6395; H01R 13/447; H01R 25/003; H01R 25/006; H01R 25/00; H01R 13/453; H01R 13/46

USPC ........... 174/66, 67, 480, 481, 50, 53, 57, 58; 220/241, 242, 3.2–3.9; 439/535
See application file for complete search history.

(56) References Cited

U.S. PATENT DOCUMENTS

| | | | | | |
|---|---|---|---|---|---|
| 2,510,745 | A | * | 6/1950 | Kilgore | ................ H01R 13/447 174/67 |
| 2,526,606 | A | * | 10/1950 | Gregg | .................. H01R 13/447 174/67 |
| 4,603,932 | A | * | 8/1986 | Heverly | ................. H01R 13/44 174/67 |

(Continued)

FOREIGN PATENT DOCUMENTS

| | | |
|---|---|---|
| CA | 2454745 | 3/2018 |
| KR | 101710777 B1 | 2/2017 |

OTHER PUBLICATIONS

Https://www.amazon.com/Dreambaby-Electrical-2-Piece-Outlet-Cover/dp/B07CL2Z1XM/ref=asc_df_B07CL2Z1XM/?tag=hyprod-20&linkCode=df0&hvadid=242044564541&hvpos=1o4&hvnetw=g&hvrand=7432265549553978.
Https://www.walmart.com/ip/Safety-1st-Outlet-Cover-with-Cord-Shortener/21784227?wmlspartner=wlpa&selectedSellerId=0&adid=22222222227015894690&wl0=&wl1=g&wl2=c&wl3=51805133231&wl4=pla-83208131591&wl5=9032366&wl6=&wl7=&wl8=&wl9=pla&wl10=8175035&wl11=online&wl12=21784227&veh=sem&gclid=CjwKCAiAlO7uBRANEiwA_vXQ-y1xlDrvk-TVh8X-JwOpOAs1lwWNKbbvMKwSymrDN2catqwgLr6WFRoCHi4QAvD_BwE.
Https://www.amazon.com/Safety-Innovations-10408-Twin-Outlet/dp/B007IUOG5A/ref=as_li_ss_tl?ie=UTF8&linkCode=sl1&tag=mj-alhltsfty-20&linkId=7af7a63a4619afd0f5d025bff00dd763&language=en_US.

*Primary Examiner* — Angel R Estrada
(74) *Attorney, Agent, or Firm* — Cynthia S. Lamon; Lamon Patent Services

(57) ABSTRACT

An enclosure assembly for isolating an electrical interface includes a cover plate adapted to frame the electrical inter- (Continued)

face or a box form having an open end leaving open access to the electrical interface, and a dome cover dimensionally and geometrically adapted to connect to the cover plate or box form via a pair of materially flexible, locking tabs having thicker interfacing edges and thinner tab bodies spaced-apart and aligning with a pair of connector through slots on the cover plate or box form, the cover dome lock able to the cover plate or box form.

18 Claims, 12 Drawing Sheets

(56) References Cited

U.S. PATENT DOCUMENTS

| | | | | |
|---|---|---|---|---|
| 4,851,612 A | * | 7/1989 | Peckham | H01R 13/6395 174/67 |
| 4,950,842 A | * | 8/1990 | Menninga | H01R 13/447 174/67 |
| 5,195,901 A | * | 3/1993 | Correnti | H01R 13/447 174/67 |
| 5,243,135 A | | 9/1993 | Shotey | |
| 5,382,755 A | * | 1/1995 | Correnti | H01R 13/447 174/67 |
| 5,731,544 A | | 3/1998 | Burck et al. | |
| 5,989,052 A | * | 11/1999 | Fields | H02G 3/14 439/373 |
| 7,179,996 B1 | | 2/2007 | Brit et al. | |
| 7,265,292 B2 | | 9/2007 | Greenfield | |
| 8,193,447 B2 | * | 6/2012 | Peckham | H01R 13/447 174/67 |
| 9,196,998 B1 | * | 11/2015 | Billington | H01R 13/4538 |

\* cited by examiner section AA

Detail B

SAFETY DOME COVER LOCK ASSEMBLY

CROSS-REFERENCE TO RELATED DOCUMENTS

The present application claims priority to a U.S. provisional patent application Ser. No. 62/597,921 entitled Safety Dome Cover Lock Assembly, filed on Jan. 7, 2020, disclosure of which is incorporated herein at least by reference.

BACKGROUND OF THE INVENTION

1. Field of the Invention

The present invention is in the field of electric hazard safety devices and pertains particularly to methods and apparatus for protecting from shock through an electrical outlet, for example GFCIs, combo outlets and switches, USB ports, and power strips.

2. Discussion of the State of the Art

In the art of electric power sourcing including lighting, there has always been a safety hazard associated with electrical outlets and switches that are within reach of toddlers or babies who might play with electrical outlets or switches. Manufacturers have addressed the issue by providing consumer safety products that might be used to mitigate risks caused by the outlets and the availability of those to potential victims of electric shock.

Among products known to the inventor, plastic baby safety plugs are available that can be inserted into outlets that make them unusable and prevent the insertion of metal into the tine slots. A problem with these devices is that they may be pulled out without much effort and the outlet is not in service when the devices are plugged into the outlet.

Another type of product is a cover assembly that may be snapped or otherwise removably fixed to a cover plate to cover an electrical outlet and prevent children or toddlers from being able to remove the cover using a childproof locking scheme. An issue with these cover products is that they require two hands to unlock and remove them. Locking components are too rigid and difficult to operate even for the parent of a child lending to frustration with the product.

Still, other issues exist with current products such as having sharp edges and or corners, and apertures extending out therefrom that may cause injury. Therefore, what is clearly needed is a locking dome cover assembly for covering electrical outlets and switches that is easy to remove and replace and is non-injurious upon incidental contact therewith.

BRIEF SUMMARY OF THE INVENTION

According to an embodiment of the present invention, an enclosure assembly is provided for isolating an electrical interface and includes a cover plate mounted to or over the electrical interface, the cover plate adapted dimensionally and geometrically to frame the electrical interface leaving open access thereto, the cover plate including at least one friction lock seat having a depth and an opening oriented inward and substantially parallel to the horizontal plane of the cover plate, the cover plate including a pair of connector through slots spaced apart and parallel, the connector slots characterized by central slot portions of wider slot width flanked by slot ends of narrower slot width, and a dome cover dimensionally and geometrically adapted to connect to the cover plate, the dome cover hollowed with an internal volume space and at least one material relief slot, the dome cover removably fixed to the cover plate via a pair of parallel, materially flexible, locking tabs having thicker interfacing edges and thinner tab bodies provided in a spaced-apart pattern on the dome cover, the tabs fitting into the connector slots provided through the cover plate, the dome cover including at least one friction lock tab adapted dimensionally and geometrically to interface with the friction lock seat in the cover plate.

In one embodiment, the electrical interface is an electrical outlet adapted for plug in appliances. In another embodiment, the electrical interface is a switch or switch panel. In a preferred embodiment, the cover plate and dome cover are rectangular with rounded corners and edges. In one embodiment, the cover plate replaces a stock cover plate used to frame the electrical interface. In one embodiment, the material relief slot(s) is/are adapted to enable egress of one or more electrical cords connected to electrical appliances plugged in to the electrical interface.

In one embodiment, the interfacing lock tab edges include a hook feature formed by placing a material relief slot along the outside surface of each tab edge, the material relief slot substantially parallel with the tab edge at each lock tab. In all embodiments, the cover plate and dome cover are fabricated from a material resistant to electrical shock. In a variation of this embodiment, the dome cover is transparent. In one embodiment, a single dome cover connects to cover plates having different framing geometries.

According to another embodiment of the present invention, an enclosure assembly for isolating an electrical interface is provided and includes a box form open at one end having double-walled sides, the box form adapted dimensionally and geometrically to contain the electrical interface leaving open access thereto, the box form including at least one material relief slot, and at least one friction lock seat having a depth and an opening, the lock seat oriented inward and substantially parallel to the horizontal plane of the box form, the box form including a pair of connector through slots spaced apart and held parallel, the through slots provided on the open end of the box form, the connector slots characterized by central slot portions of wider slot width flanked by slot ends of narrower slot width, and a dome cover dimensionally and geometrically adapted to connect to the box form at the open end, the dome cover hollowed with an internal volume space and at least one material relief slot, the dome cover removably fixed to the cover plate via a pair of parallel, materially flexible, locking tabs having thicker interfacing edges and thinner tab bodies provided in a spaced-apart pattern on the dome cover, the tabs fitting into the connector slots provided through the box form, the dome cover including at least one friction lock tab adapted dimensionally and geometrically to interface with the friction lock seat in the box form.

In this embodiment, the electrical interface is a surge protector having multiple electrical plug seats, an electrical power cord, plug, and at least one power switch. In this embodiment, the material relief slots in the box form and dome cover align upon connecting the dome cover to the box form. In a variation of this embodiment, the box form and the dome cover each have two diametrically opposed relief slots, one at each end, the relief slots of the box form and dome cover aligning upon connecting the dome cover to the box form. Also, in this embodiment, the material relief slots are adapted to enable egress of one or more electrical cords connected to electrical appliances plugged into the electrical interface.

In this embodiment, the interfacing lock tab edges include a hook feature formed by placing a material relief slot along the outside surface of each tab edge, the material relief slot substantially parallel with the tab edge at each lock tab. In a preferred embodiment, the box form and dome cover are fabricated from a material resistant to electrical shock. In a variation of the embodiment, the dome cover is transparent.

DETAILED DESCRIPTION OF THE INVENTION

In various embodiments described in enabling detail herein, the inventor provides a unique enclosure for isolating an electrical interface to prevent electrical shock. An object of the present invention is to provide an enclosure that isolates the electrical interface from tamper by human contact while enabling access to and use of the electrical interface. The present invention is described using the following examples, which may describe more than one relevant embodiment falling within the scope of the invention.

Figure 1:
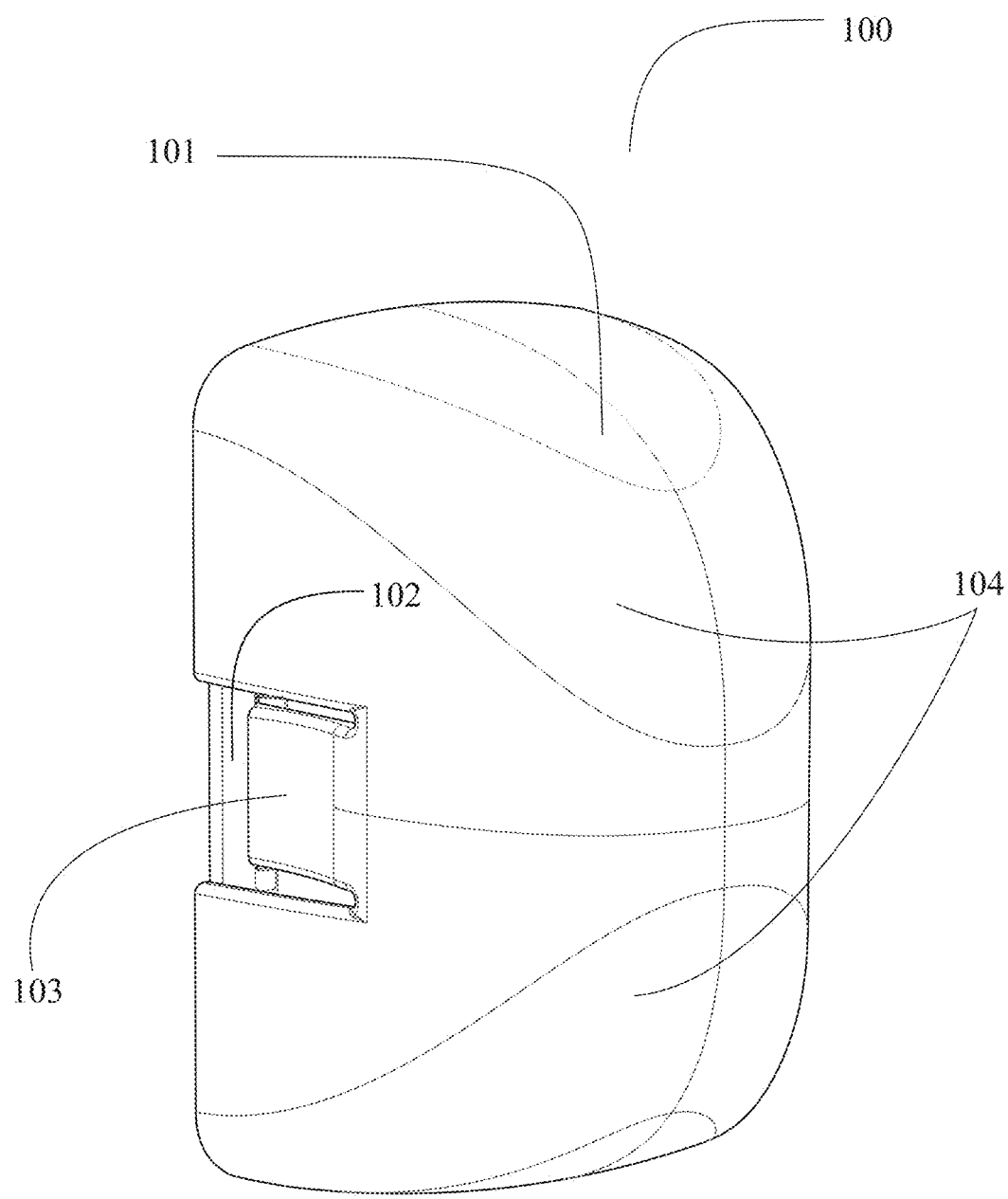
FIG. 1 is a perspective view of a dome safety cover assembly installed on or over an electrical outlet in an embodiment of the present invention.

FIG. 1 is a perspective view of a dome safety cover assembly 100 installed on or over an electrical outlet in an embodiment of the present invention. Assembly 100 comprises a rounded rectangular dome 101, fashioned with diametrically opposed flexible locking tabs 103. Dome cover 101 covers and locks onto a cover plate 102 that is part of assembly 100 and is designed to replace a typical cover plate of a stock electrical outlet (not visible in this view). Locking tabs 103 are designed to be pressed inward to engage with a pair of slots (not visible) provided through cover plate 102 and lock onto a rim using a hook feature at the free end of the tabs.

Dome cover 101 is hollow on the inside facing the outlet and may have a uniform wall thickness. Rectangular dome 101 may be molded from an electrical grade resilient plastic adapted to prevent electric shock. It is noted herein that dome cover 101 is radiused or rounded at all outward-facing edges and corners as noted by rounded surfaces 104 generally depicting the rounded areas on dome 101. The rounding of the outward edges and corners of dome cover 101 eliminates any potential sharp edges or corners that may hurt a baby or a toddler, or an adult person that may inadvertently contact the dome cover. The rounded corners are not germane to the invention and may remain corners or have other shapes.

Dome cover 101 and cover plate 102 may be molded parts fabricated from a rigid or resilient electrical grade plastic adapted to prevent electric shock from contact with the outlet. Dome cover 101 includes enough internal space to house at least one electrical plug plugged into the electrical outlet, which may be a two-pronged or a three-pronged outlet in this example. Dome cover 101 may include at least one material relief slot (not illustrated) disposed strategically for providing material relief for the passage of an electric plug cord 105 (of FIG. 8) enabling egress from the outlet to a connected electrical appliance.

Figure 2:
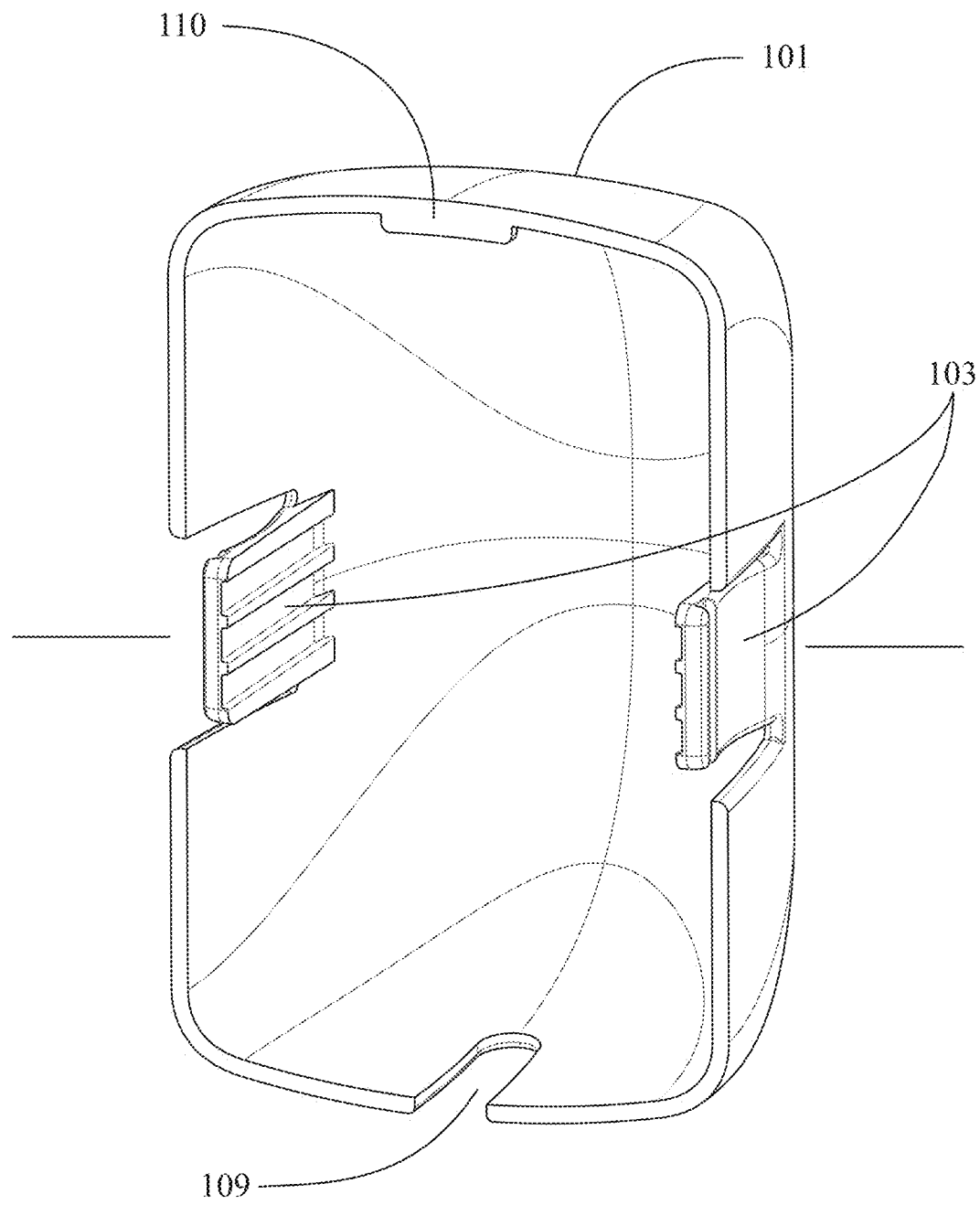
FIG. 2 is a perspective view of the dome cover of the assembly of FIG. 1 removed and rotated to depict additional features.

FIG. 2 is a perspective view of dome cover 101 removed and rotated to depict additional features. Dome cover 101 includes a friction lock tab 110 that fits to a lock tab seat 111 (of FIG. 6A) provided on a mounting cover plate such as a plate 102 not visible in this view but described further below. Both lock tab 110 and tab seat 111 are oriented inward and held substantially parallel to the horizontal plane of the cover plate. In this embodiment, dome cover 101 is adapted to fit onto a cover plate using two diametrically opposed flexible locking tabs 103 as described above. Dome cover 101 covers and locks onto a cover plate (not visible) that is part of assembly 100 of FIG. 1 adapted to replace or cover a typical cover plate of a stock electrical outlet. Locking tabs 103 may be materially thinner than the wall thickness of cover dome 101 in specific regions and are primarily designed to be pressed inward from the outside of the dome cover 101 toward the center of dome cover 101 according to the direction of the arrows to engage with a pair of parallel slots (not visible) provided through a cover plate and lock onto a rim using a hook ledge feature formed by material relief or molding process at the free end of the flexible tabs.

In this embodiment, dome cover 101 includes a radiused slot 109 adapted to allow for pass-through of one or more than one electrical cord. Slot 109 is wide enough and long enough to allow at least two electrical cords to pass through it. Slot 109 is provided in dome cover 101 at bottom center giving egress for one or more electrical cord to pass through while the assembly is locked while electric appliances are plugged into the outlet. There may be more than one cord pass-through slot like slot 109 provided in dome cover 101 without departing from the spirit and scope of the present invention. Dome cover 101 is completely hollowed inside and is deep enough to accommodate or provide sufficient space for covering any electrical plug profile used on the outlet.

Figure 3:
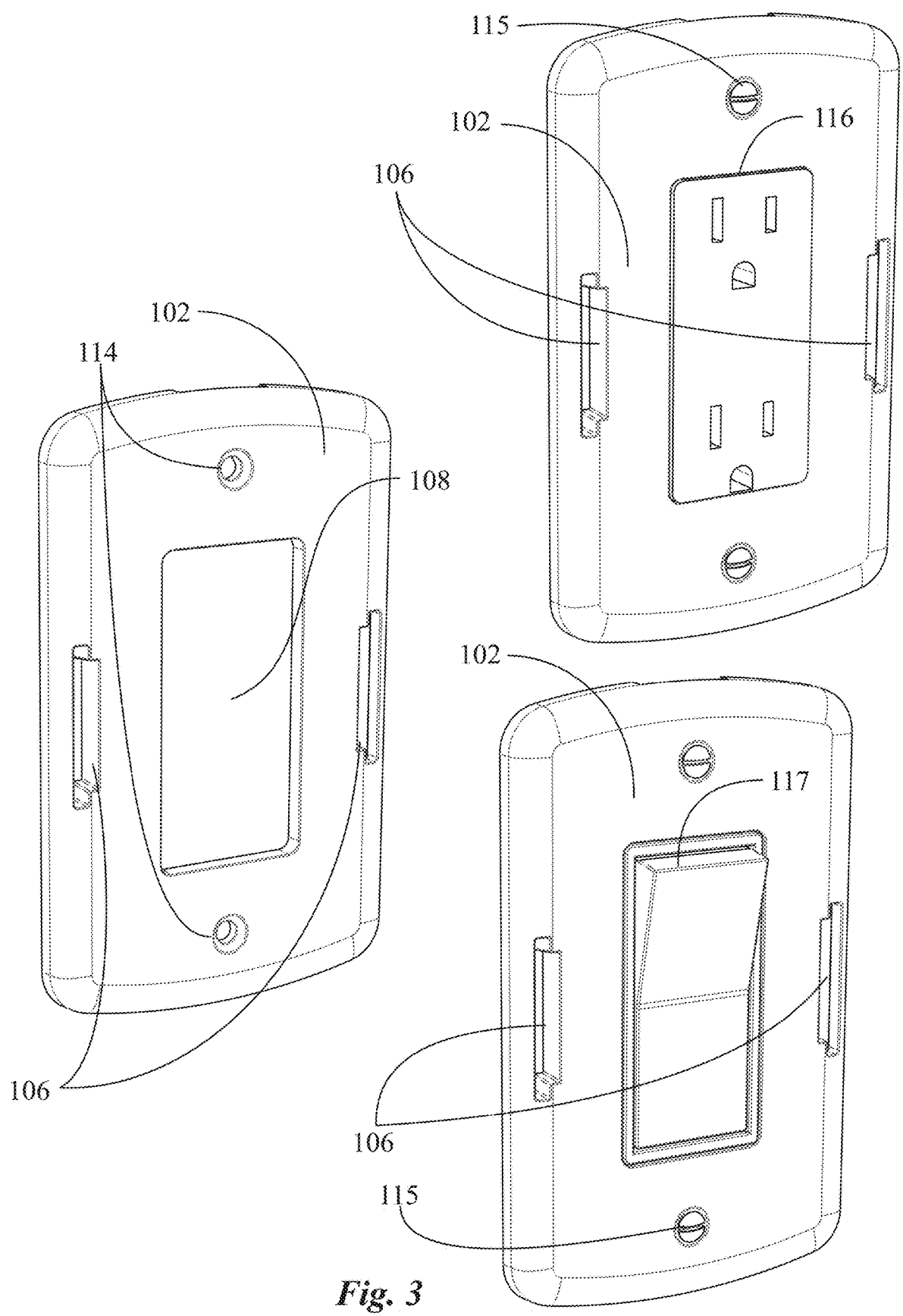
FIG. 3 is a perspective view of a cover plate for covering an electrical outlet and receiving cover dome 101 of assembly 100 of FIG. 1.

FIG. 3 is a perspective view of several views of cover plate 102 for covering an electrical outlet and for receiving locking cover dome 101 of assembly 100 of FIG. 1. In this view, cover plate 102 is depicted by itself to the left of the other views in this illustration. Cover plate 102 may be molded from a rigid or resilient electrical grade plastic adapted to prevent electric shock. Cover plate 102 may have a similar or same material thickness as dome cover 101 of FIG. 2. In this embodiment, Cover plate 102 is adapted to fit over and be screwed onto a stock electrical outlet (AC two or three-prong) or switch with two screws as depicted in this isolated view by the presence of screw hole openings 114 placed through cover plate 102 in a vertical alignment and spaced accordingly for covering and aligning with the screw seats on the stock electrical outlet or switch.

It is noted herein that cover plate 102 may be used to cover the electrical outlet replacing a stock outlet or switch plate cover. In an alternative embodiment, a cover plate like plate 102 may be placed over a stock cover plate using the same screw pattern as the wall plate and the outlet frame without departing from the spirit and scope of the present invention.

Cover plate 102 includes a central through openings 108 dimensioned to fit over the electrical outlet or switch assembly that cover plate 102 is designed for. For example, referring to the top right view of cover plate 102, openings 108 is a rectangular opening that frames a rectangular outlet face 116 supporting a pair of stock three-prong plug outlets. Cover plate 102 is rounded at the corners and at least the top and bottom edges. Cover plate 102 includes diametrically opposed anchor slots 106 provided through the surface wall of the cover plate at parallel and spaced positions amenable to the spacing between flexible lock tabs 103 of cover 101 (of FIG. 1). Cover plate 102 has a depth and an internal volume such that anchor slots 106 mar receive the locking tabs of cover dome 101 through the cover plate wall with ample space between the inside surface of the cover plate to the wall surface to accommodate the hook edges at the free ends of the locking tabs of cover dome 101.

Referring still to the view at top right, cover plate 102 may be mounted to the outlet hardware with screws 115, which may be the same screws used to mount the stock cover plate. Referring now to the view at bottom right, openings 108 frames a rectangular switch plate 117 of roughly the same footprint as plug outlet 116 of the view on top right. In this embodiment, cover plate 102 is adapted to cover either the plug outlet 116 or the switch 117, typically replacing any stock cover plates.

Figure 4A:
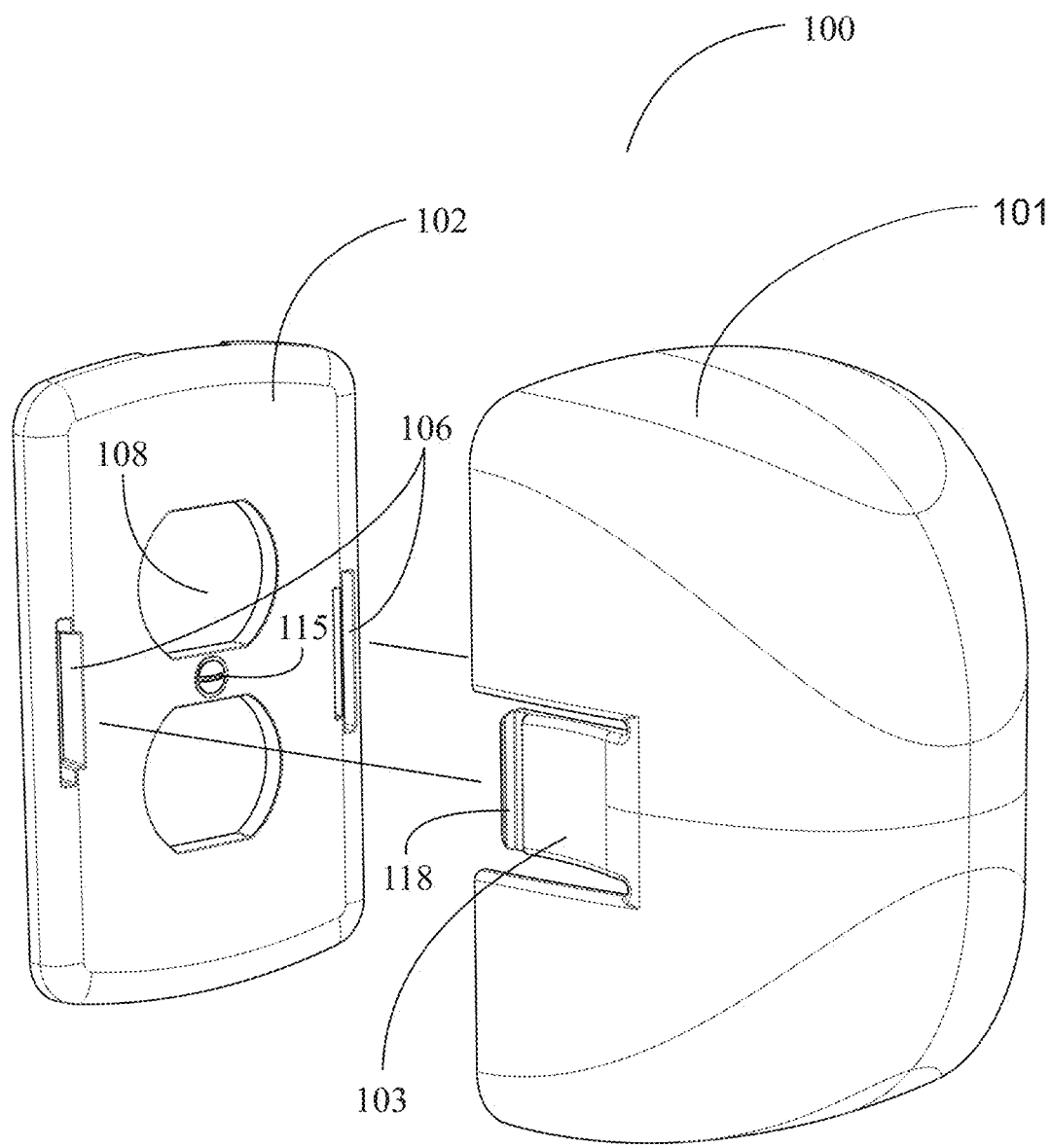
FIG. 4A is a perspective view of the dome safety cover assembly of FIG. 1. with the dome cover aligned to be installed on the cover plate.

FIG. 4A is a perspective view of safety dome cover lock assembly 100 of FIG. 1 with the dome cover aligned to be installed on the cover plate. In this embodiment, dome cover 101 and cover plate 102 are separated to depict orientation and alignment of cover 101 over plate 102 for successful installation. In this embodiment, cover plate 102 is designed for a two-plug stock AC plug outlet (plugs not depicted). In this case, cover plate 102 is mounted with a single center screw 115.

Slots 106 in cover plate 102 are larger in width in the center portion of the length of the slots to provide clearance for the thickness of a hook-style outward facing ledges 118 on each tab 103. Slots 106 are narrower on either side of the slot length outside the wider portion of the slots. This design allows tab 103 to be inserted through slot 106 and hook onto the back outward edge of the slot. Tab 103 is held to a thinner thickness dimension above ledge 118 so that once inserted and locked by spring resilience of the tabs, the dome cover 101 may be urged upward or downward to engage the narrower part of slot 106 preventing the ledge feature from rising back out of the slot at either position.

In this view cover plate 102 has two identical openings 108 each one framing a plug outlet face in the typical fashion of a stock cover plate. In general, a user may align dome cover 101 in a position for install to cover plate 102 after it is mounted into place. Tabs 103 are urged inward toward the center of dome cover 101 and then inserted into the wider center portion of slots 106 at each side and through until ledges 118 are past the cover plate wall thickness. Releasing the tabs after insertion as described above causes the tabs to spring back outward from the center of dome cover 101 to catch the ledges against the back inside edges of the slots 106.

Figure 4B:
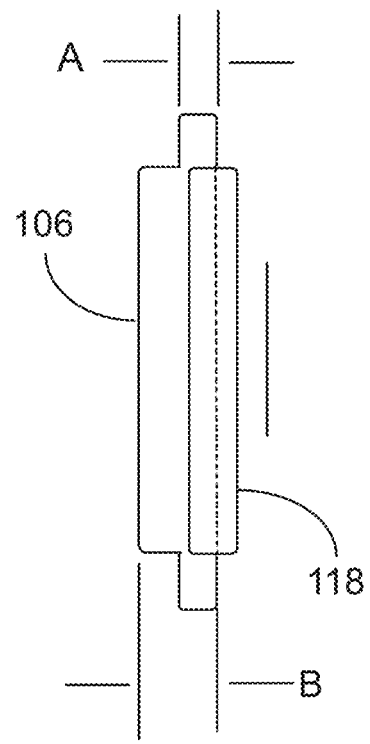
FIG. 4B shows an expanded portion of the slots and ledges of FIG. 4A.

FIG. 4B shows an expanded portion of the slots and ledges of FIG. 4A In this example, the hooked edge 118 of dome cover locking tab 103 is inserted through the slot 106 and hooks over the outside back edge of the longer portion of the slot 106. Dimension B is sufficiently large enough to enable the user to squeeze the diametrically opposed dome cover tabs 103 together enough to insert them into the slots 106. Releasing the pressure allows them to spring back into position against the outside edges of the slots. At this point the hook 401 is engaged and a first lock mechanism is established. A second lock mechanism is established by sliding the dome up or down into the narrow portions of the slot defined by dimension A. Once the locking tab 103 is in position in the narrower portion, the tabs 103 may not be depressed for release. Dimension A is sufficiently large enough to only accommodate the thickness of locking tabs 103, and ledge 118, such that the dome cover 101 may then be urged up or down according to the double arrow along the slots to lock at the top or bottom end of the assembly at dimension A. The ledge portion 118 is locked into position not only by the spring force, but also via the narrow slot portion at dimension A.

Figure 5:
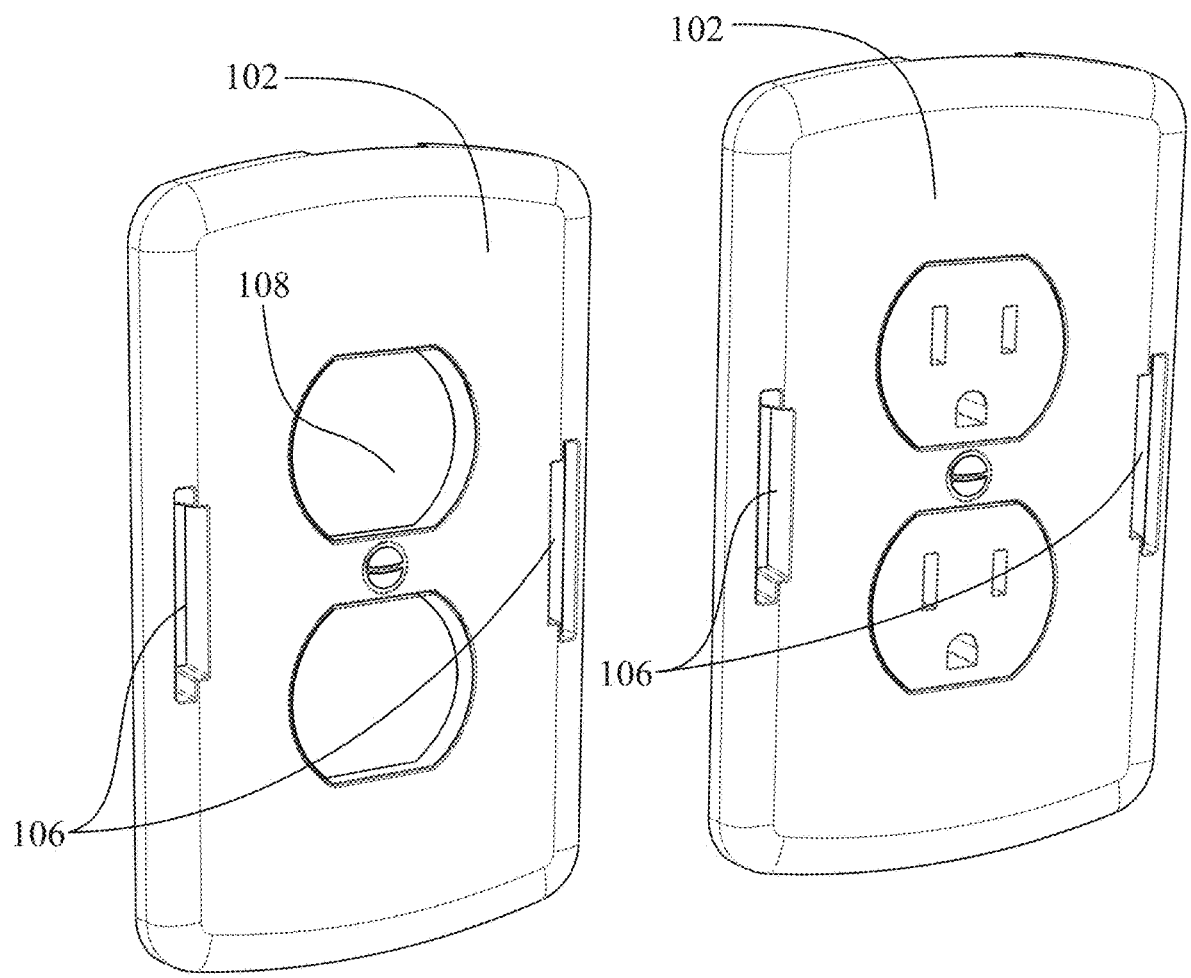
FIG. 5 is a perspective view of two views of the cover plate of FIG. 4A, one view in isolation, and one view covering an electrical outlet.

FIG. 5 is a perspective view of two views of cover plate 102 of FIG. 4A: one view in isolation and one view covering an electrical outlet. Cover plate 102 may be adapted to cover an electrical outlet or switch, as shown in FIG. 3 for example in place of a stock cover. In such a case, the cover plate openings 108 may take any symmetrical form required to frame the outlet or switch providing access to the facilities under normal use conditions. Slots 106 may also vary in size and shape depending upon the size and shape needed for the attached cover dome.

Referring now to the view of cover 102 at the right in this illustration, the depth of cover plate 102 if used to directly cover an outlet may be such that the plug seat and the top face of the cover plate may be generally flush or with the plug seat slightly recessed. In one alternative embodiment, cover plate 102 may be fabricated with more depth having uniformly higher sidewalls. More depth may be useful if cover plate 102 is adapted to fit over a stock cover plate and be mounted to the outlet or switch plate using the stock screw patterns.

In one embodiment, mounting the cover plate 101 over a stock cover plate may allow for a measured recess of the outlet face or switch plate, the recess depth controlled by the depth of the cover plate 102 from the inside surface of the plate to the edge of any plate wall assuming the walls are uniform in height. It may be noted herein that cover plate 102 may vary in geometric form or shape without departing from the spirit and scope of the present invention. For example, a cover plate may be designed to cover a split-level elevation outlet where one plug seat presents at a different plane than another. A safety dome cover lock assembly may be designed and adapted to facilitate a four-plug or six-plug electrical outlet panel, an electrical switch panel or a combination thereof.

Figure 6A:
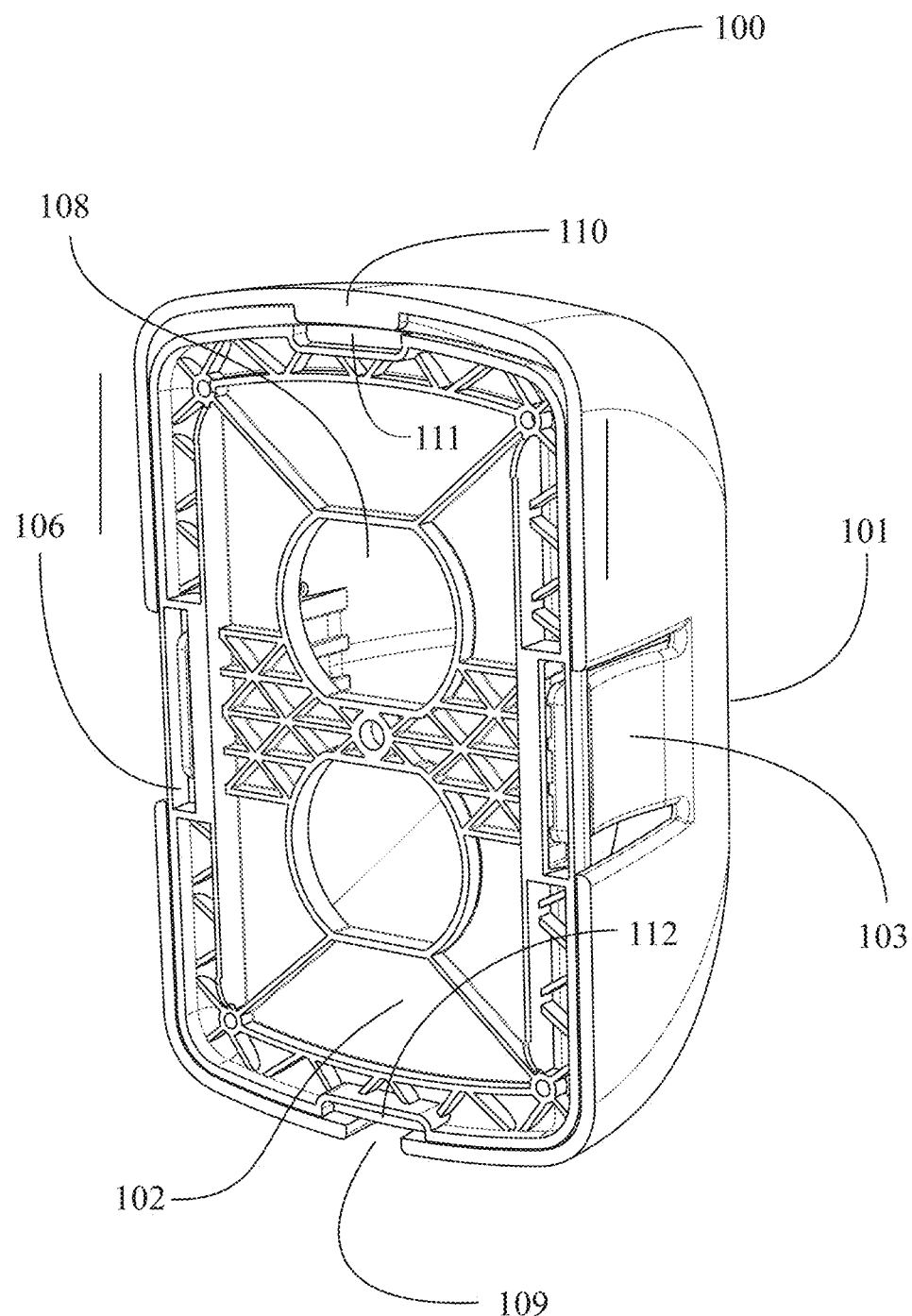
FIG. 6A is a perspective view of the safety dome cover lock assembly of FIG. 1 in assembly and rotated to reveal the underside of the assembly.

FIG. 6A is a perspective view of the safety dome cover lock assembly 100 of FIG. 1 in assembly and rotated to reveal the underside of the assembly. In this view, dome cover 101 is locked onto cover plate 102 with openings 108 clearly visible. The underside of cover plate 102 may be ribbed around the underside periphery and in parts of the plate surface to improve rigidity and strength of the component. The overall length of dome cover 101 on the inside exceeds the overall outside length of cover plate 102. This enables ample room to urge the installed dome cover 101 upward or downward as allowed by the slot lengths of slots 106 and the greater length of the dome cover 101 on the inside.

In this embodiment, dome cover 101 includes a friction lock tab 110 that locks over or into a friction lock seat 111 provided for the purpose on the underside of cover plate 102. When tabs 103 are inserted through slots 106 and released, a user may squeeze on tabs 103 to reduce the spacing thereof to pull them back out of the slots removing dome cover 101 from cover plate 102. However, once dome cover 101 is snapped down onto cover plate 102, a user may urge dome cover 101 downward according to the direction of the arrows to engage the friction lock seating tab 110 to tab seat 111 and engaging the lower narrower dimensions of slots 106 with tabs 103 preventing pull off of the dome cover by squeezing the tabs together.

Specifically, there are three separate locking mechanisms working together to ensure the dome may not be removed by an unauthorized person, like a child or toddler. The tab lock involving tabs 103 and slots 106 prevent pull off of the dome cover by squeezing the tabs together is one mechanism. Once the tabs are locked in place the dome may slide down to engage a second locking mechanism where seating tab 110 engages with seat 111. Additionally, a third locking mechanism is provided via slots 106, wherein when the engaged tab 103 slides up or down, the narrower portion of slot 106 provides a third locking mechanism, prohibiting dome 102 from being removed even when tabs 103 are pushed in.

To remove dome cover 101 from cover plate 102, a user may first squeeze tabs 103 together using minimal or moderate pincer force, slide dome cover 101 upward or downward depending on which friction lock is engaged with moderate force to disengage the friction lock and slide the dome cover vertically to the center position realigning tabs 103 to the wider portion of slots 106 so that the dome cover 101 may be lifted out of the cover plate 102.

Additionally, it is important to note that the cable egress slot 109 may be positioned at the top of plate 102, enabling tab 110 to engage with seat 112, or at the bottom of plate 102, enabling tab 110 to engage with seat 111, by rotating the dome 101 prior to placement. In this manner stiff cords that are difficult to manipulate may egress at either end of plate 102.

Slot 109 enables at least two electrical cords from appliances plugged into the outlet to egress the dome cover without interfering with the function of the dome cover. The inside peripheral edge of dome cover 101 generally conforms to the outside peripheral edge of cover plate 102 except for a gap difference in length for an aesthetic finish and to present a less dangerous profile having no sharp edges or corners or apertures extending from the assembly and no appreciable gaps between the interfacing edge of cover dome 101 and the wall.

Figure 6B:
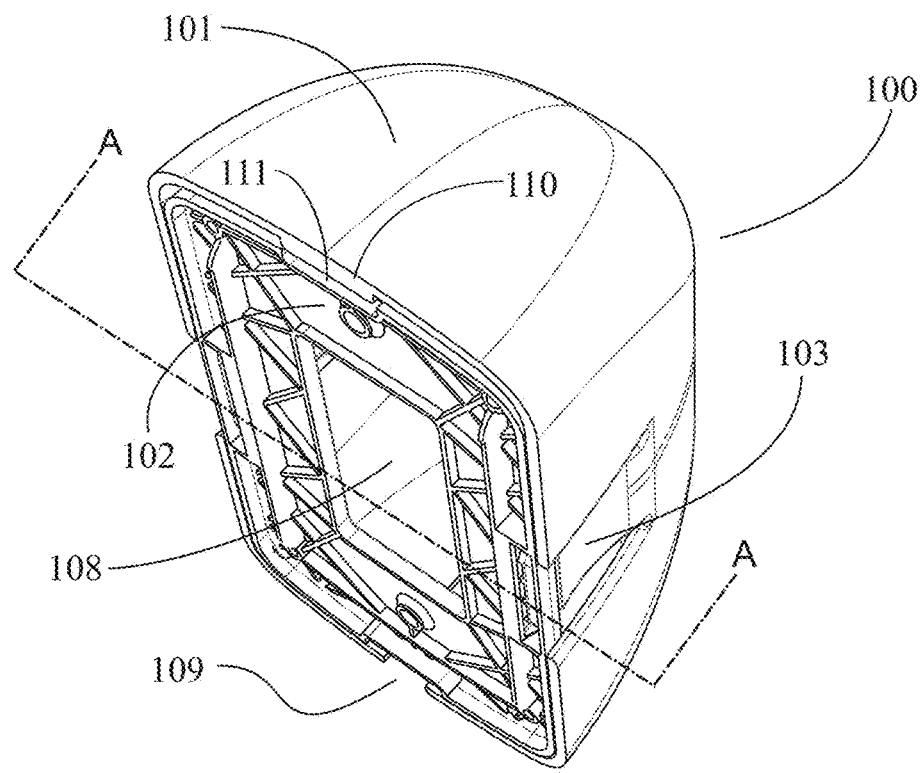
FIG. 6B is a perspective view of the safety dome cover lock assembly of FIG. 1 in assembly depicting section line AA through the center portion of the tab slots.
Figure 6C:
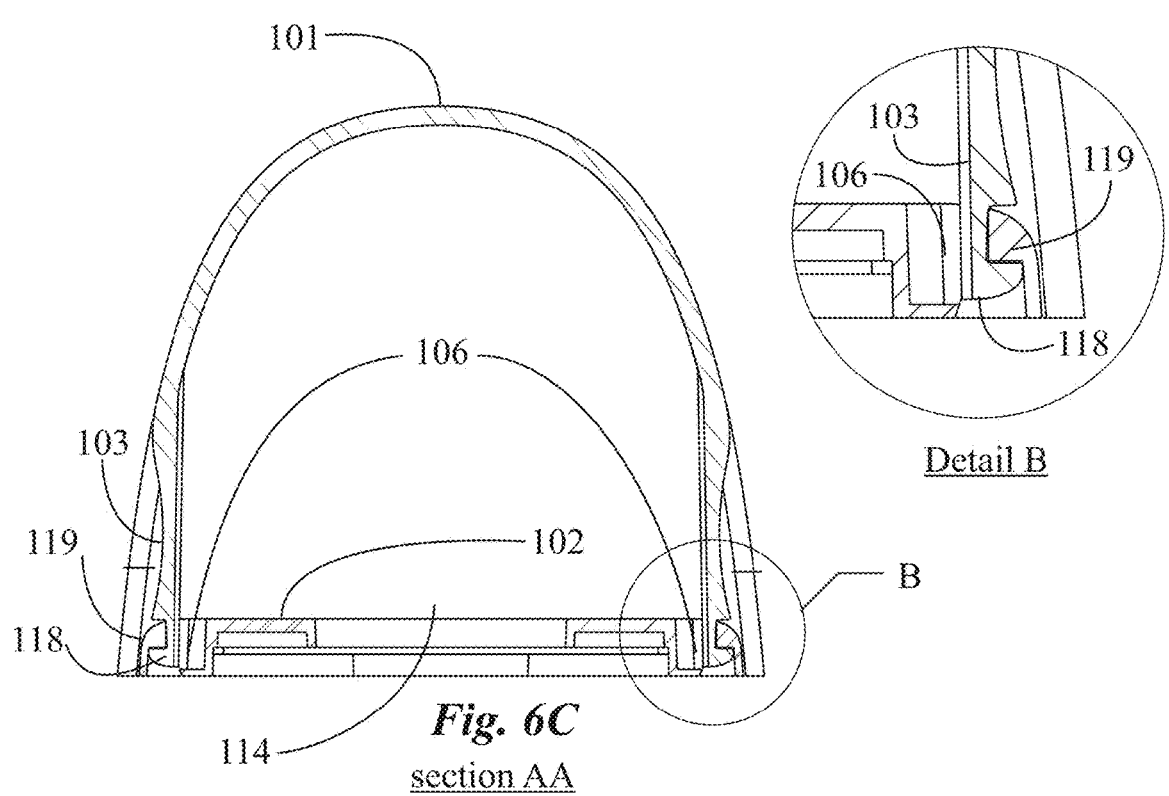
FIG. 6C is a sectioned view of the assembled safety dome cover lock assembly of FIG. 6A taken along the section line AA.

FIG. 6B is a perspective view of safety dome cover lock assembly 100 of FIG. 1 in assembly depicting section line AA through the center portion of slots 106. FIG. 6C is a sectioned view of the assembled safety dome cover lock assembly of FIG. 6A taken along the section line AA. Referring now to FIG. 6B, dome cover assembly 100 has a friction lock at top center (tab 110, seat 111) and slot 109 at bottom center. In this version of the assembly, tabs 103 are urged in toward the center of cover dome 101 and inserted into the middle portions of slots 106 on cover plate 102.

Dome cover 101 may be locked onto cover plate 102 by urging the dome cover downward to engage the friction lock involving tab 110 and seat 111 and to access the narrower portion of slots 106 on the lower side with tabs 103. Once dome cover 101 is seated in cover plate 102 and then locked at the top or the bottom end a user may use one or more electric appliances safely in the presence of children including toddlers and babies without worrying that they will breach safety dome cover assembly 100 or be injured by a live electric current.

A user simply removes cover dome 101 from the mounted cover plate 102 and plugs in one or more appliances to be used and replaces dome cover 101 making sure the cords are stacked in slot 109 and then locking the dome cover to the cover plate by sliding the cover upward or downward.

Referring now to FIG. 6C, in section, tabs 103 are formed to be of thinner material than dome cover 101 so that dome cover 101 may be urged further up or down with respect to cover plate 102 to engage tabs 103 with the narrower portion of slots 106 thus preventing withdrawal of the dome cover from the cover plate. In this embodiment, the ledge feature 118 at the bottom of tab 103 may be formed as a result of placing a material relief slot across the end of tab 103 disposed a small distance above the lower edge thereof. In this view tabs 103 are released and spring into position to latch a second ledge feature 119 formed within on slot 106 of plate 102. This position is in the central wider portion of slot 106 enabling the tabs to be pincered back into the slots for dome cover removal. Detail B is depicted in enlarged view to depict a closer view of the interface and to depict section lines, which may be assumed to be present in the larger sectioned part.

Figure 7:
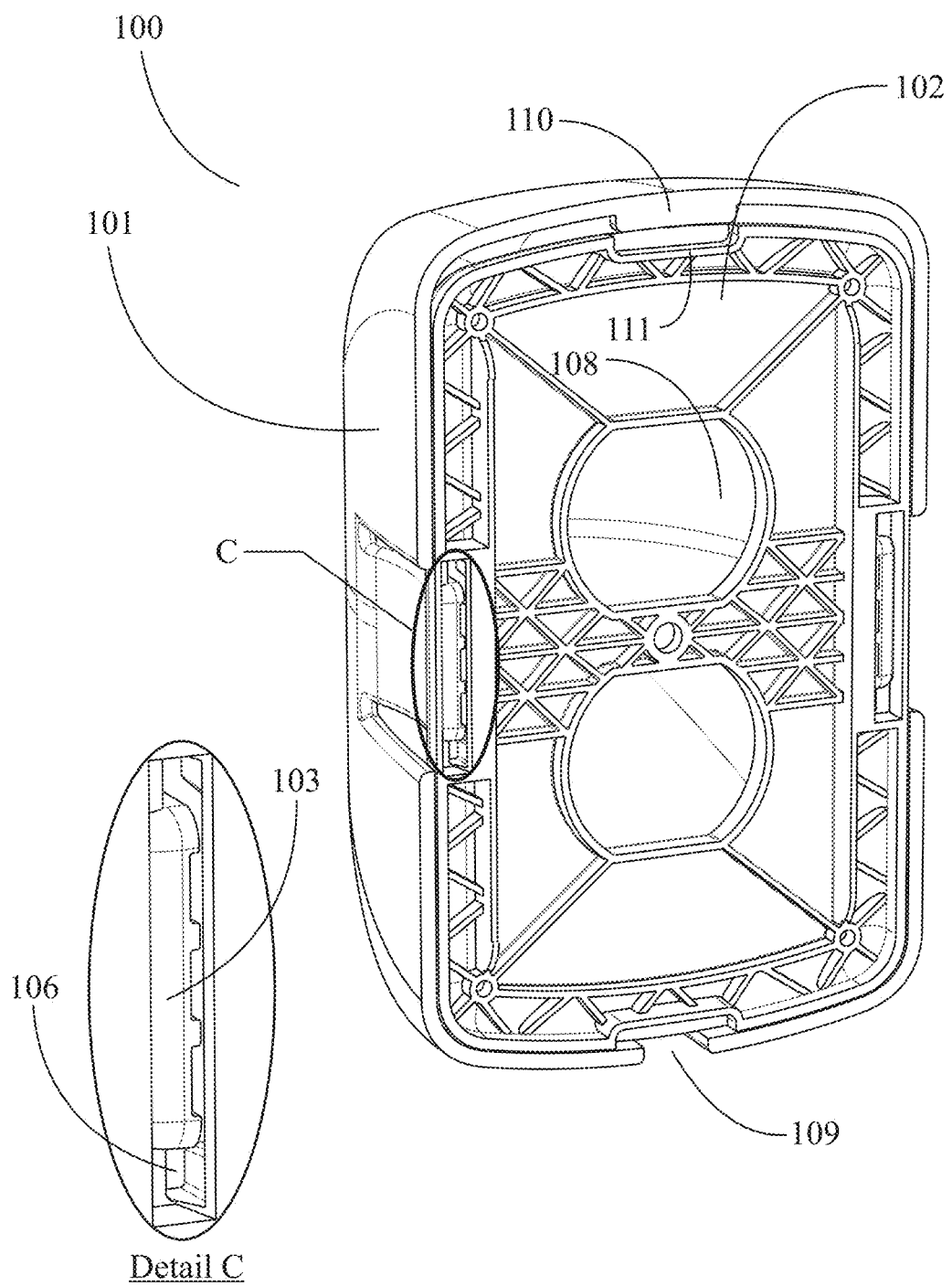
FIG. 7 is a perspective view of the safety dome cover lock assembly of FIG. 1 in assembly and rotated to reveal the underside of the assembly.

FIG. 7 is a perspective view of safety dome cover lock assembly 100 of FIG. 1 in assembly and rotated to reveal the underside of the assembly. In this view, cover plate 102 is adapted with two symmetrical openings 108 for framing the electrical plug seats of the outlet. Various different framing openings 108 designs of cover plate 102 may be provided wherein the dome cover 101 may be a modular cover fitting all of the cover plates. In this view, the tabs 103 are locked into the center portion of slots 106 (Detail C) and the friction lock comprising tab 110 and seat 111 are not engaged. A gap exists between the inside top edges of dome cover 101 and the outside top edge of cover plate 102. The width of the gap may be generally the same width as friction tab 110. Tabs 103 are inserted into slots 106 at the wider central portion of the slots. Detail C depicts the end of a slot 103 engaged within slot 106 in an extrapolated enlarged view labeled detail C.

Figure 8:
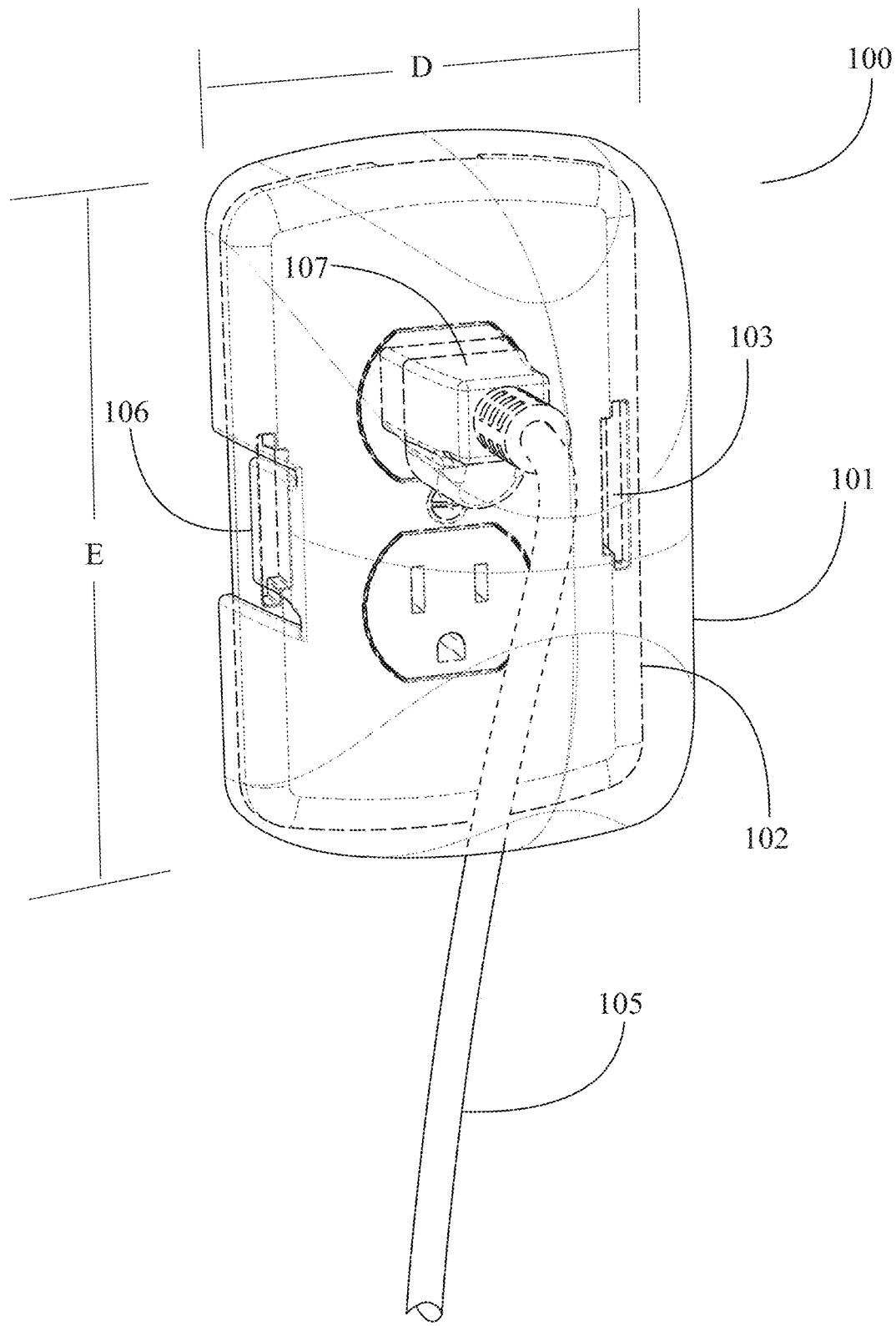
FIG. 8 is a perspective view of the safety dome cover lock assembly of FIG. 1 mounted to a wall outlet according to an embodiment of the present invention.

FIG. 8 is a perspective view of safety dome cover lock assembly 100 of FIG. 1 mounted to a wall outlet according to an embodiment of the present invention. In this view, dome cover 101 is rendered transparent or made of transparent material to allow a user to see the electrical connections beneath dome cover 101 while the dome cover is installed and locked on to cover plate 102. Tabs 103 are locked into slots 106 and the friction lock at top center is presumed engaged.

Cover plate 102 is designed to frame two electrical plug seats vertically aligned, and one plug 107 having electrical cord 105 is plugged into the upper most electrical plug seat. Dome cover 101 may be molded deeper or shallower without altering the length or width or tab structure thereof. Therefore, there may be ample room within the dome cover to protect the electrical plugs without touching them or being too close to them.

In one embodiment, a plug adapter may be inserted into the plug seat followed by a plug tethered to an appliance resulting in a higher profile of the electrical plug interface. Dome cover 101 may be provided having a deeper profile to accommodate the extra height. For a standard dual plug outlet, cover plate 102 has an overall width dimension D of about 3.4 inches and an overall length dimension of about 5.4 inches. Slot 109 (not visible) on dome cover 101 enables egress of cord 105 out of the locked dome assembly 100 and to the appliance.

Figure 9:
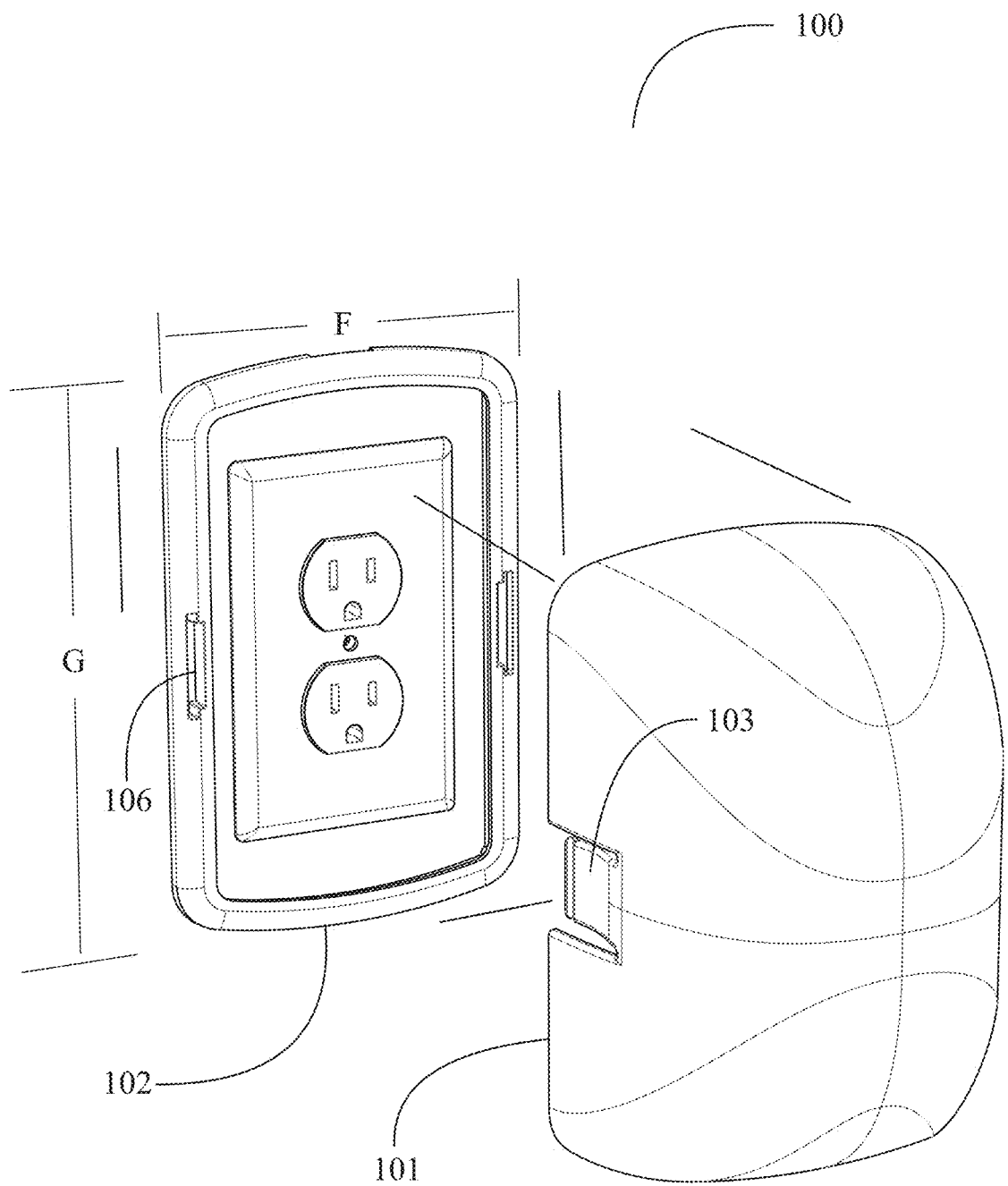
FIG. 9 is a perspective view of the safety dome cover lock assembly 100 of FIG. 1 depicting cover plate 102 mounted over an electrical outlet and dome cover 101 removed and aligned for installation.

FIG. 9 is a perspective view of safety dome cover lock assembly 100 of FIG. 1 depicting cover plate 102 mounted over an electrical outlet and dome cover 101 aligned for installation. In this embodiment, cover plate 102 has a cut away area exposing the entire outlet and functions more like a frame. Cover plate 102 has a width F of about 4.6 inches in this example, and a length G of about 7.1 inches. It is noted herein that the width, length, and height dimensions of the cover plate 102 and dome cover 101 completing assembly 100 may vary according to design without departing from the spirit and scope of the present invention.

A user may depress tabs 103 of dome cover 101 while bringing the dome cover to cover plate 102 in the general direction of the arrows depicted. The user may insert tabs 103 fully into slots 106 and release pressure on the tabs causing them to spring out and latch to cover plate 102. The user may then urge the dome cover 101 downward engaging the friction lock and the narrower portions of the tab slots 106 in the direction of the vertical arrows. In one embodiment, dome cover 101 is transparent to further enhance safety by allowing the plugs inserted into the plug seats of the outlet to be viewed through the dome.

Figure 10A:
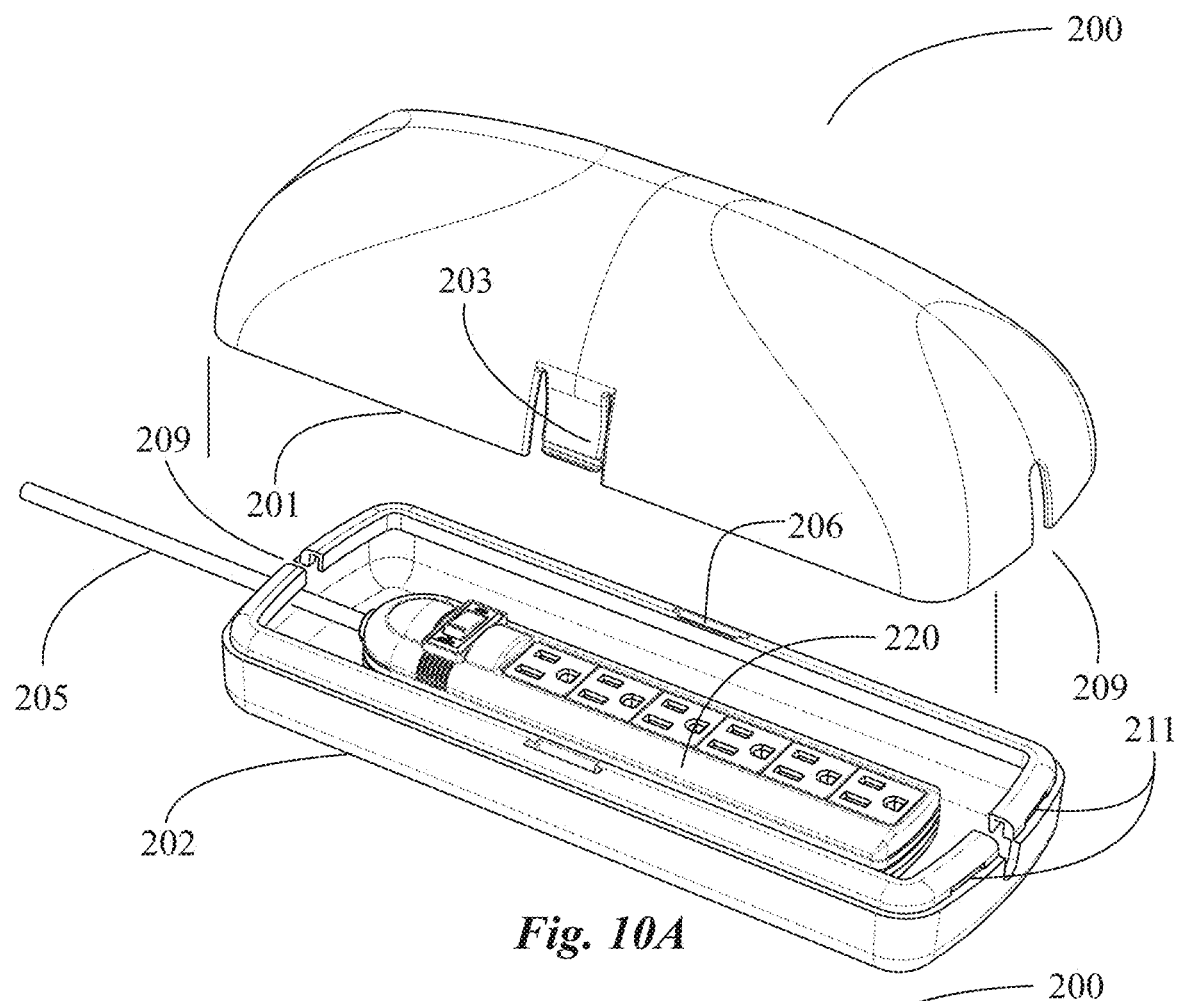
FIG. 10A is a perspective view of a safety dome cover lock assembly according to another embodiment of the present invention.

FIG. 10A is a perspective view of a safety dome cover lock assembly 200 according to another embodiment of the present invention. Dome cover lock assembly 200 is adapted to protect from shock from an electrical surge protector 220 having six plug outlets (plug seats) arranged linearly on a strip. Assembly 200 includes a rounded dome cover 201 and a rectangular box seat 202. Box seat 202 is formed or molded into a box form having an internal compartment that is long enough and wide enough to accommodate surge protector 210 placed therein.

Box seat 202 includes tab slots 206 adapted to receive flexible tabs 203 on dome cover 201 in the same fashion described above relative to safety dome cover lock assemble 100 of FIG. 1. The corners and edges of box seat 202 may be rounded to protect toddlers or small children from sharp corners or edges. Dome cover 201 is adapted to fit against box seat 202 and is installed on the box form by a user urging tabs 203 inward, bringing the dome cover 202 downward according to the direction of the arrows, aligning the tabs 103 to the slots 106. The user may then insert tabs 203 into slots 206 then release the tabs so they lock in place over the underside rims at the outside lower edges of the slots. Slots 206 may have the same slot length and width variations as slots 106 described above. Tabs 203 may have the same tab dimensions and shape profile as tabs 103 described further above.

In this embodiment, there may be friction locks (not illustrated) at either or both sided of the assembly (friction seats 211 visible). Material relief slots 209 may be provided at either or at both ends of box seat 202. Material slots 209 serve the same function as material slots 109 described above, that is to provide room for electrical cords (not pictured) to egress out of dome cover 201. Surge protector 201 may be placed into box seat 202 with electrical cord 205 having egress from the assembly 200 at either side of the box seat 202 through one of slots 209.

There may be two or more friction locks per end of assembly 200, for example four friction tabs 203 on dome cover 201 and four friction tab seats 206 on box form 202 (friction tab seats 211 visible). The inside length dimension of dome cover 201 may be larger than the outside length of box seat 202 by the width dimensions of a friction lock tab to enable the assembly to be friction locked from either side as described above with safety dome cover lock assembly 100 and friction lock tabs 110 and 112. In this embodiment, the length of slots 209 and the depth of dome cover 202 may be enhanced to accommodate potentially 6 cords that must egress out from the assembly to respective appliances and cord 205 out to a power outlet used to feed the surge protector.

For a surge protector application, different assembly shapes may be formed or molded for different shapes of surge protector units for example a long rectangular surge protector verses a square surge protector having two columns of plug seats instead of a single line of plug seats.

Figure 10B:
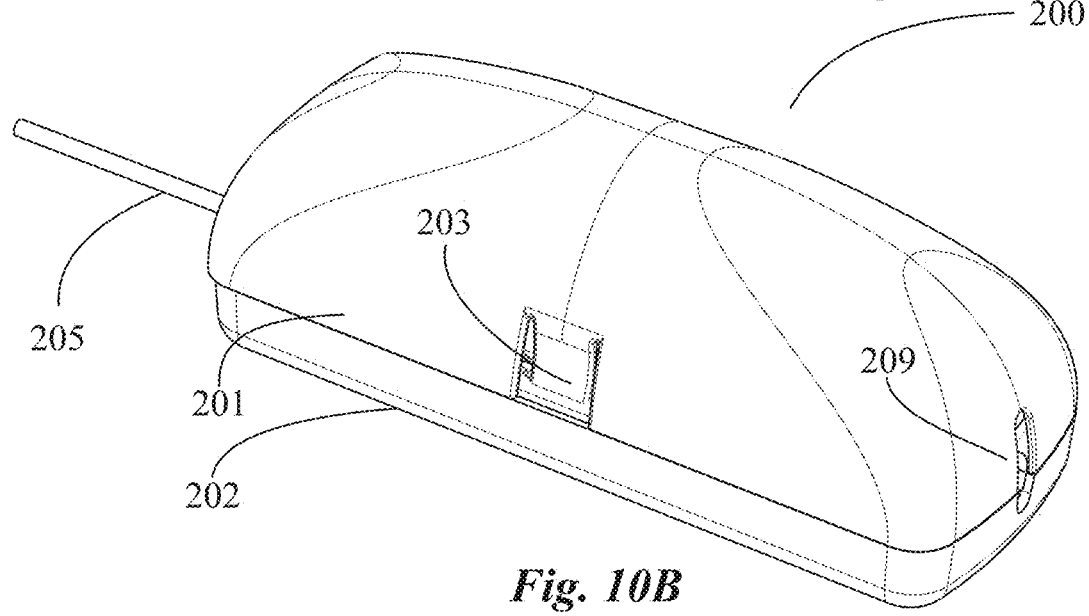
FIG. 10B is a perspective view of safety dome cover lock assembly of FIG. 10A assembled and locked.

FIG. 10B is a perspective view of safety dome cover lock assembly 200 of FIG. 10A assembled and locked. In this assembled and locked state dome cover 201 overlaps rectangular box seat 202 at the end of the assembly depicting egress of surge protector cord 205 and is relatively flush to the box seat at the other end. The friction locks on the flush end are engaged from the user sliding dome cover 201 toward the opposite end of the box seat 202. This action also engages tabs 203 to the narrower portion of slots 106 at that side of the assembly.

It will be apparent to the skilled artisan that the safety dome cover lock assembly may be used to protect a night light, aroma emitting device, a telephone charging device or other plug-in items that are not limited to appliance cords or interfaces. In one embodiment, small micro-perforations may be provided through the dome cover making it breathable so that an aromatic emitter unit is not significantly hindered from emitting aromatic particles or vapors out into a room. Safety lock dome cover assemblies like assembly 200 are modular and can be installed for surge protection points on a stage where multiple musical components may be plugged into surge protectors to protect those components from tampering or becoming unplugged during a session or concert indoors or outside. A version of the present invention using a dome cover and cover plate having the features described and enabled above can be used to cover a wall outlet where the outlet is not in use for an intended purpose such as needing repair. In this case, no plugs are expected so the safety dome cover may have a much shorter rounded side profile from the wall and may stick out approximately one half inch. Safety dome covers and cover plates are interchangeable for identical outlet configurations. If a "flat dome" is used to cover an outlet that is intended not to be used, a deeper dome may be swapped out for the flat dome when the outlet is again ready for use. The same cover plate may be used in both instances.

These exemplary descriptions do not preclude other implementations and use cases not described in detail. For example, the dome cover and plate may be used in other embodiments with wall switches, dimmer switches, and virtually any type of dangerous planar attachment that needs protection from children. The uses and methods depicted within this description are purely emblematic of definitive ways in which to build and operate this invention and are not to be understood to be limiting of scope in any way. While the uses and methods have been described with a certain degree of particularity, it is to be noted that many alterations could be made in the details of the construction and the arrangement of the apparatus and its components without departing from the spirit and scope of this invention. The present invention is limited only by the breadth of the claims below.

The invention claimed is:

1. An enclosure assembly for isolating an electrical interface comprising:
    a cover plate mounted to or over the electrical interface, the cover plate adapted dimensionally and geometrically to frame the electrical interface leaving open access thereto, the cover plate including at least one friction lock seat having a depth and an opening oriented inward and substantially parallel to the horizontal plane of the cover plate, the cover plate including a pair of connector through slots spaced apart and parallel, the connector slots characterized by central slot portions of wider slot width flanked by slot ends of narrower slot width; and
    a dome cover dimensionally and geometrically adapted to connect to the cover plate, the dome cover hollowed with an internal volume space and at least one material relief slot, the dome cover removably fixed to the cover plate via a pair of parallel, materially flexible, locking tabs having thicker interfacing edges and thinner tab bodies provided in a spaced-apart pattern on the dome cover, the tabs fitting into the connector slots provided through the cover plate, the dome cover including at least one friction lock tab adapted dimensionally and geometrically to interface with the friction lock seat in the cover plate.

2. The enclosure assembly of claim 1, wherein the electrical interface is an electrical outlet adapted for plug in appliances.

3. The enclosure assembly of claim 1, wherein the electrical interface is a switch or switch panel.

4. The enclosure assembly of claim 1, wherein the cover plate and dome cover are rectangular with rounded corners and edges.

5. The enclosure assembly of claim 1, wherein the cover plate replaces a stock cover plate used to frame the electrical interface.

6. The enclosure assembly of claim 1, wherein the material relief slot is adapted to enable egress of one or more electrical cords connected to electrical appliances plugged in to the electrical interface.

7. The enclosure assembly of claim 1, wherein the interfacing lock tab edges include a hook feature formed by placing a material relief slot along the outside surface of each tab edge, the material relief slot substantially parallel with the tab edge at each lock tab.

8. The enclosure assembly of claim 1, wherein the cover plate and dome cover are fabricated from a material resistant to electrical shock.

9. The enclosure assembly of claim 1, wherein the dome cover is transparent.

10. The enclosure assembly of claim 1, wherein a single dome cover connects to cover plates having different framing geometries.

11. An enclosure assembly for isolating an electrical interface comprising:
    a box form open at one end having double-walled sides, the box form adapted dimensionally and geometrically to contain the electrical interface leaving open access thereto, the box form including at least one material relief slot, and at least one friction lock seat having a depth and an opening, the lock seat oriented inward and substantially parallel to the horizontal plane of the box form, the box form including a pair of connector through slots spaced apart and held parallel, the through slots provided one the open end of the box form, the connector slots characterized by central slot portions of wider slot width flanked by slot ends of narrower slot width; and
    a dome cover dimensionally and geometrically adapted to connect to the box form at the open end, the dome cover hollowed with an internal volume space and at least one material relief slot, the dome cover removably fixed to the cover plate via a pair of parallel, materially flexible, locking tabs having thicker interfacing edges and thinner tab bodies provided in a spaced-apart pattern on the dome cover, the tabs fitting into the connector slots provided through the box form, the dome cover including at least one friction lock tab adapted dimensionally and geometrically to interface with the friction lock seat in the box form.

12. The enclosure assembly of claim 11, wherein the electrical interface is a surge protector having multiple electrical plug seats, an electrical power cord, plug, and at least one power switch.

13. The enclosure assembly of claim 11, wherein the material relief slots in the box form and dome cover align upon connecting the dome cover to the box form.

14. The enclosure assembly of claim 11, wherein the box form and the dome cover each have two diametrically opposed relief slots one at each end, the relief slots of the box form and dome cover aligning upon connecting the dome cover to the box form.

15. The enclosure assembly of claim 11, wherein the material relief slots are adapted to enable egress of one or more electrical cords connected to electrical appliances plugged in to the electrical interface.

16. The enclosure assembly of claim 11, wherein the interfacing lock tab edges include a hook feature formed by placing a material relief slot along the outside surface of each tab edge, the material relief slot substantially parallel with the tab edge at each lock tab.

17. The enclosure assembly of claim 11, wherein the box form and dome cover are fabricated from a material resistant to electrical shock.

18. The enclosure assembly of claim 11, wherein the dome cover is transparent.

* * * * *